D. C. JORDON.
Hand-Plow.
No. 28,376
Patented May 22, 1860.
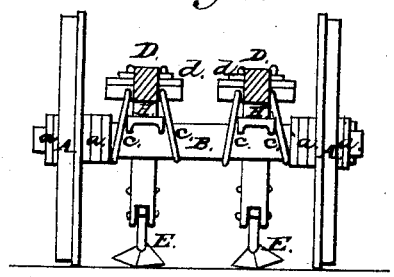
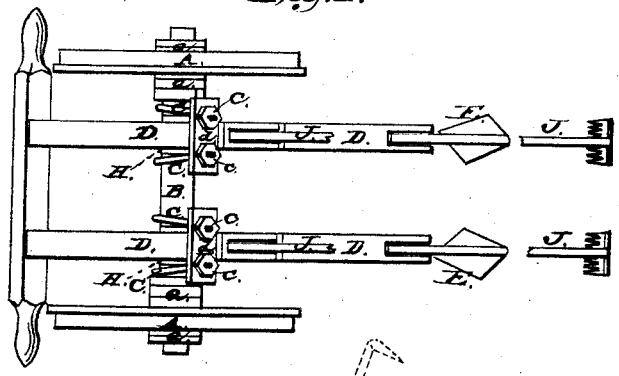
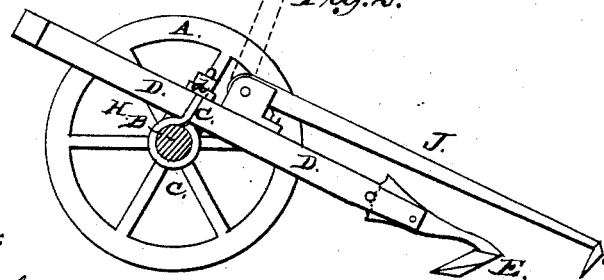
Witnesses:
Inventor:
David C. Jordon
per Munn &
Attorneys
N. PETERS, PHOTO-LITHOGRAPHER, WASHINGTON, D. C.

UNITED STATES PATENT OFFICE.

DAVID C. JORDON, OF CENTREPORT, NEW YORK.

IMPROVEMENT IN HAND-CULTIVATORS.

Specification forming part of Letters Patent No. 28,376, dated May 22, 1860.

*To all whom it may concern:*

Be it known that I, DAVID C. JORDON, of Centreport, in the county of Suffolk and State of New York, have invented a new and Improved Hand-Cultivator; and I do hereby declare that the following is a full, clear, and exact description of the same, reference being had to the accompanying drawings, forming a part of this specification, in which—

Figure 1 represents a top or plan view of the improved cultivator. Fig. 2 is a side elevation of the same, showing the rakes or rake in two positions. Fig. 3 is a rear view with the handles cut off, showing the saddles for holding the arms carrying the teeth or hoes to the axle-tree. Fig. 4 shows a tooth, two of which are used in place of the hoes for loosening the earth about the plants.

Similar letters of reference indicate corresponding parts in the several figures.

The object of this invention is to obtain a cheap and portable hand-cultivator for eradicating weeds and loosening the soil in drill-husbandry, and for passing where the plow would be too cumbrous, to eradicate the weeds with their roots from about young and tender plants, and to open the soil to admit air, warmth, and dew to the roots of the plants by scraping and raking away the weeds at the same time. The invention provides for adjusting the several parts forming the machine so as to adapt them to different kinds of work and for narrow or wider spaces. The machine is to be operated by manual labor, so that a perfect control can be had over it, all as will be hereinafter described and represented.

To enable those skilled in the art to fully understand my invention, I will proceed to describe its construction and operation.

In the drawings, A A represent two wheels turning on an axle, B, and placed on the ends of the axle-tree between rings or collars $a\ a$, the inside ones which may be removed for contracting the wheels for narrow drills or rows of plants.

D D are the arms, to which are attached the blades E, that are pivoted to the arms in such a manner as to be adjusted for scraping superficially deeper or shallower. The blades are of a flat triangular shape, and have their cutting-edges placed obliquely, so that they will each conform to the sides of the hill or rows and scrape the weeds down into the furrow between two rows. The arms, which are in their natural state inclined over the axle with the blades E E resting on the surface of the ground, are attached to the axle B in a peculiar manner, to be hereinafter described, and have a cross-bar, G, fastened to their upper ends, with handles on each end, by which the machine is guided over the field, and the arms are operated so as to control the scraping and destruction of weeds about the plants without injury to the tender roots of the plants.

The arms D D are placed on saddles H H, which give the arms a firm and steady hold on the axles, and the saddles and arms are locked securely to the axle by eyebolts $c\ c$, which pass round the axle on each side of the arms and through clamping-plates $d\ d$, and receive nuts on their ends, as clearly represented in the drawings. This attachment of the arms carrying the scrapers, it will be seen, is capable of lateral adjustment by loosening the nuts of the bolt $c\ c$, and they may thus be set to suit the work to be performed.

Provision is further made with this machine for raking the weeds away from the plants after they are cut up by the scraping teeth or plates, and for this purpose is hinged or jointed to each arm D a rake, J, which succeed the scrapers and carry off the weeds. Besides, they leave the earth around the plants free and smooth, they assist in loosening the surface soil, and in many instances will prove valuable in connection with the scrapers. When they are not to be immediately brought into actual practice they may be thrown up out of the way, as represented in red lines, Fig. 3.

For elevating the soil, loosening it, and working round the plants to lighten the soil, two plows like the one represented by Fig. 4 may be attached to the arms D D in the place of the scrapers.

Having thus described my invention, what I claim as new, and desire to secure by Letters Patent, is—

The combination of the several parts herein described, whereby is obtained adjustability and portability, when the same are arranged in the relation set forth, for the purposes specified, it being understood that I do not claim each part separately or irrespective of its substantial arrangement.

DAVID C. JORDON.

Witnesses:
WM. W. WOOD,
JAMES CONNER.